Feb. 5, 1957 A. G. VAN ALSTYNE 2,780,806
RADAR REFLECTOR FOR AIRCRAFT
Filed Nov. 29, 1954 2 Sheets-Sheet 1

INVENTOR,
ALVIN G. VAN ALSTYNE
BY
ATTORNEY

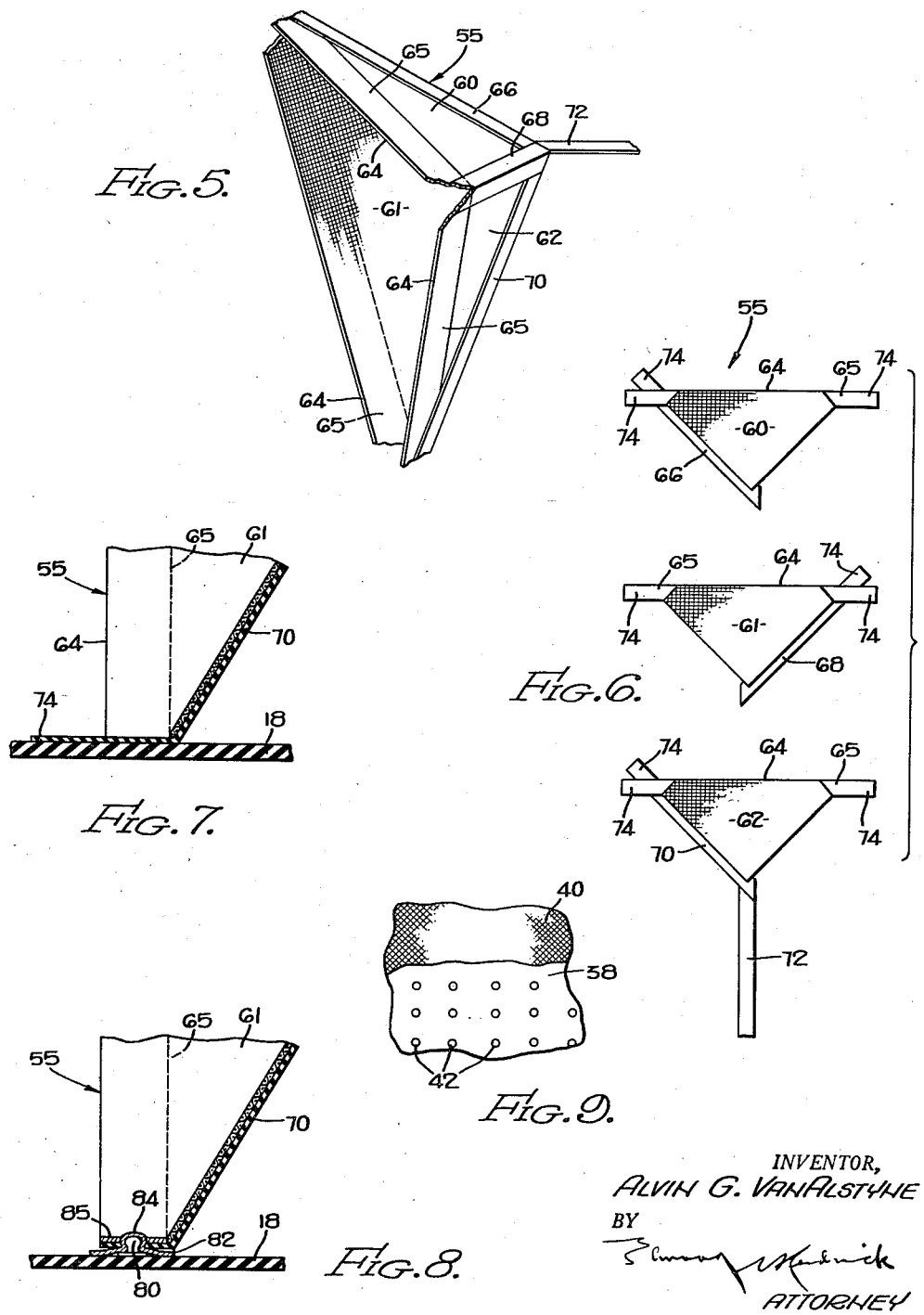

United States Patent Office 2,780,806
Patented Feb. 5, 1957

2,780,806

RADAR REFLECTOR FOR AIRCRAFT

Alvin Guy Van Alstyne, Los Angeles, Calif., assignor to Gilfillan Bros. Inc., Los Angeles, Calif., a corporation of California Application November 29, 1954, Serial No. 471,809

14 Claims. (Cl. 343—18)

This invention relates to radar reflector means for use on an aircraft to facilitate radar detection of the aircraft for such purposes as guidance and automatic control in the landing of the aircraft.

One problem to which the invention is directed is to improve the reflective response of the aircraft to radar signals. Usually the radar reflection consists solely of "glint" responses from the various surfaces of the aircraft and such responses vary whenever the aircraft makes even a slight change in altitude or aspect. Consequently the pattern of radar reflection from an aircraft approaching a landing continually varies with each scan and must be averaged out over a number of successive scans.

Another problem to which the invention pertains is to determine with accuracy the actual elevation of the landing wheels of the aircraft from the ground. Such accuracy is of vital importance in a radar system that is intended to guide the aircraft into actual ground contact. This problem is made difficult by the fact that the discrepancy between the location of the aggregate center of "glint" response of the aircraft and the location of the landing wheels of the aircraft may vary over a distance from 5 to 35 feet.

A third problem that arises in military use is to improve the radar reflectively of an aircraft for landing purposes without increasing the reflectivity of the aircraft in normal flight for the benefit of enemy radar.

All three of these problems may be met by mounting a radar reflector on the landing gear of an aircraft for retraction into an effectively shielded position inside the aircraft during normal flight. This solution is not satisfactory, however. In the first place the mounting of such a reflector on the landing gear increases drag. In the second place a reflector mounted on the landing gear is exposed to the weather and is also vulnerable to damage by accidental impacts.

The present invention meets all of these problems by mounting radar reflector means inside a tire of a landing wheel of the aircraft. Thus the invention raises the reflectivity of the aircraft and does so at the level of the landing wheels without increasing the reflectivity of the aircraft in normal flight. The new location has no detrimental aerodynamic effect whatsoever and, of course, the radar reflector means inside the tire is protected both from the weather and from ordinary causes of accidental damage.

The preferred practice of the invention utilizes a reflector comprising three mutually perpendicular reflecting surfaces forming a well known corner configuration, which configuration offers exceptionally efficient reflection in the general direction of the divergence of the three surfaces. In this regard a feature of the invention is the concept of employing a plurality of circumferentially spaced corner reflectors in a landing wheel tire with all the reflectors directed in the circumferential direction that will position the lowermost reflector to face in the direction of flight of the aircraft.

There is, of course, an insertion loss or dissipation of energy of the radar signal by the material of the tire and this loss may be on the order of 3 decibels. A corner reflector in a landing wheel tire, however, may raise the amplitude of the reflected radar signal by as much as 16 decibels so that the net gain in strength of the reflected signal may be on the order of 13 decibels. With this gain and with the threshold of the radar receiver system appropriately adjusted the detected signal becomes a sharp peak rather than a broad envelope and, of course, such a narrow sharp signal is conducive to high accuracy.

A corner reflector of the present type for use in a tire may be made of metal of any thickness, or metal foil, or metal screen, or may be made of metallized fabric or metallized paper. Preferably light flexible sheet material is used, such as suitable metal gauze, and the light flexible sheet material is anchored inside the tire in such manner as to maintain the desired configuration. For this purpose three generally triangular sheets may be suitably interconnected to form a concave reflector having an open triangular front. The front of such a reflector may be connected to the surrounding tire structure at three points and the rear or corner end of the reflector may be suitably connected to the tire at a fourth point. As will be explained, the reflector may be so oriented and so connected to the surrounding tire as to avoid interference with inflation and deflation of the tire and also to avoid damage to the reflector itself.

A further feature of the invention is the concept of mounting such a flexible corner reflector inside a tire by fastener means such as snap fasteners or the like. This concept makes it possible to incorporate the fastener devices in the tire structure at an early stage in the fabrication procedure and then to install the flexible corner reflectors in a simple and convenient manner at a later stage.

The various features and advantages of the invention will be apparent in the following detailed description of a selected embodiment of the invention considered with the accompanying drawings.

In the drawings, which are to be regarded as merely illustrative:

Fig. 5 is a perspective view of a second form of reflector unit, the corner portions of the reflector unit being broken away for clarity of illustration;

Fig. 6 is a plan view of three parts that may be assembled together to make the reflector unit shown in Fig. 5;

Fig. 7 is a fragmentary sectional view on an enlarged scale showing how a corner of the reflector unit shown in Fig. 5 may be connected to the surrounding wall of the inner tube of the tire;

Fig. 8 is a similar view illustrating a further modification of the invention involving the use of snap fasteners; and Fig. 9 is a fragmentary plan view of a composite flexible sheet that may be used in some practices of the invention.

Figure 1:
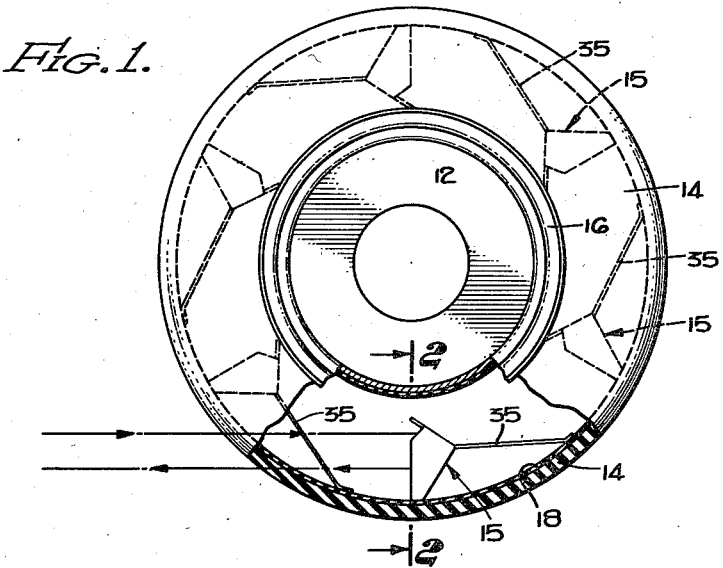
Fig. 1 is a view partly in side elevation and partly in section showing how a plurality of reflector units may be installed in the tire of a landing wheel of an aircraft.
Figure 3:
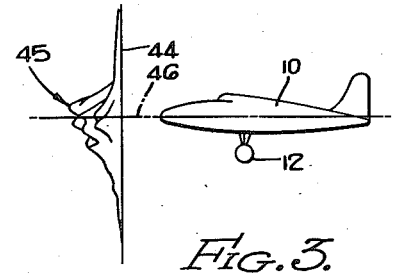
Figs. 3 and 4 are diagrammatic views showing patterns of radar signal reflections from an aircraft.
Figure 4:
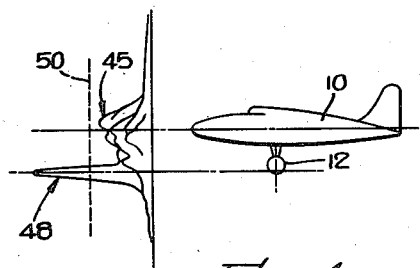

The diagrams shown in Figs. 3 and 4 show an airplane 10 having extended landing wheels 12 and Fig. 1 shows how a tire 14 on at least one of the landing wheels may be provided with a plurality of reflector units 15 in accord with the teaching of the invention. In this instance the tire 14 houses six of the reflector units 15 at positions of equal circumferential spacing around the tire.

It is contemplated that each of the reflector units 15 will be of generally concave configuration and preferably of the configuration of a so-called corner reflector which has three mutually perpendicular reflecting surfaces meeting to form a corner. All of the reflector units 15 face in the same circumferential direction which is the direction that places the lowermost reflector unit in a position facing forward in the direction of flight of the aircraft. It is well known that a reflector unit of this "corner" configuration has high reflective efficiency from its open or concave side and that the high efficiency is maintained over a relatively wide range of angles. Thus with six equally circumferentially spaced reflector units in the tire 14, at least one of the units will be in an effective position when the landing gear is lowered for approach to a landing field. For example, the arrows in Fig. 1 show how the lowermost unit reflects a radar signal.

The tire 14 is mounted on the rim 16 of the landing wheel 12 and the reflector units 15 are mounted in and attached to the tire inner tube 18. A feature of the invention is the concept of making the reflector units 15 out of flexible sheet material to make it possible to install the units inside the inner tube of a tire without interfering with the normal function of the tire. The flexible construction and method of installation also eliminates risk that the reflector units will be damaged by inflation and deflation of the tire or by the impact forces created when the tire touches ground in making a landing.

It is apparent that various flexible sheet materials capable of radar reflection may be used and that the reflector units may take various forms and may be mounted inside the tire in various ways in various practices of the invention.

In this first embodiment of the invention, each of the reflector units 15 is made of a well known metal screen or gauze material of relatively fine mesh in which the intersecting metal filaments are electrically interconnected by metal deposition carried out electrolytically. In accord with the well known corner configuration each reflector unit 15 has three mutually perpendicular sheet portions 20, 21 and 22 which meet at a corner 24. In this instance the three sheet portions are made from a single sheet of material which is folded on the two lines 25 and 26 and the sheet portion 22 is formed with a narrow marginal flap 28 that is bonded to the back of the sheet portion 21 to interconnect these two sheet portions along the juuncture line 30.

Figure 2:
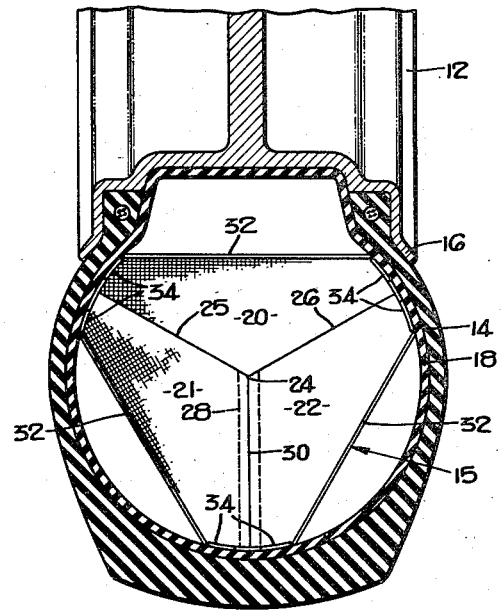
Fig. 2 is an enlarged transverse section taken as indicated by the line 2—2 of Fig. 1.

Each of the three sheet portions 20, 21 and 22 is triangular in general configuration so that the three outer edges of the three sheet portions respectively form a generally triangular configuration as the reflector is viewed from the front in Fig. 2. In the preferred practice of the invention, however, each of the corners of this forwardly facing triangular arrangement is truncated with the projected corners of the triangular configuration lying outside the tire 14.

The three sheet portions 20, 21 and 22 of the reflector may be attached to the surrounding inner tube 18 in any suitable manner. In this particular practice of the invention, each of the sheet portions 20, 21 and 22 is a complete triangle with the two end portions of each triangle folded to form a tongue 34 and each of these tongues 34 is directly bonded to the inner surface of the inner tube 18. The bonding may be accomplished by vulcanization or by the use of any suitable adhesive material. Each of the three sheet portions, 20, 21 and 22, provides two of these tongues 34, there being two tongues at each of the three corners of the reflector unit.

To complete the construction it is necessary to connect the corner 24 of each of the reflector units to the interior of the inner tube 18 in a manner to hold the flexible sheet material to the desired "corner configuration." For this purpose a flexible piece of tape 35, which is preferably of elastic material, may be attached at one end to the corner 24 of the unit and may be attached at the other end to the inner surface of the inner tube 18 at a point well rearward from the reflector unit, as indicated in Fig. 1.

An important feature of the described arrangement is that each of the reflector units 15 is connected to the surrounding inner tube 18 at three equally spaced points with two of the points in the region of the landing wheel rim 16 and the third point on the medial plane of the inner tube at the maximum inner circumference of the tube. The advantage of this arrangement is that the two points of connection nearest the rim 16 are affected only to minor extent by inflation and deflation of the tire and the third lowermost point shifts along the medial plane of the tire when the tire is inflated or deflated or when the tire is deformed by impact against the ground during a landing. Thus the lowermost point of connection is the only one that shifts to any substantial extent with changing cross-sectional configuration of the tire and the shift in response to an impact force is in a direction to collapse the flexible reflector unit rather than distend the reflector unit. It can be appreciated that such an arrangement avoids the creation of destructive stresses in the flexible sheet material.

It is also to be noted that since the outer edges 32 provide substantial clearance between the inner tube and the reflector unit on three sides of the reflector unit, the six reflector units do not prevent the flow or circulation of air through the inner tube. Thus the six reflector units do not hinder inflation or deflation of the tire and do not interfere with the transmission of pressure changes throughout the circumference of the tire occasioned by impact of the tire against the ground. If desired, however, these clearance spaces may be eliminated by extending the sheet portions 20, 21 and 22 to make each of the reflector units completely span the interior of the inner tube. If each reflector unit does completely span the interior of the inner tube, however, there must be adequate freedom for air flow through the sheet material of the reflector units.

When each reflector unit is made of woven material, as in this first embodiment of the invention, there may be adequate freedom for air flow through the mesh of the material. In any event the material may be perforated for this purpose so long as the individual perforations are of less dimension in cross section than one-half of the wave length of the radar signal. Preferably the perforations are on the order of one-eighth inch or less. Fig. 9, for example, shows how a flexible sheet comprising a layer of metal foil 38 bonded to a layer of fabric 40 may be provided with numerous small perforations 42 for this purpose.

Fig. 3 shows diagrammatically how the radar signals reflected back from an airplane approaching a landing are detected to form an envelope on one side of a reference line or base 44 in the absence of applicant's invention. It will be noted that the envelope comprises a number of signals received on different scans and that these signals vary to provide a pattern of distributed signal peaks of varying amplitude. Such a signal pattern results from the fact that the "glint" reflection from the widely distributed surfaces of the body of the airplanes changes in pattern with each minute change in aspect of the approaching aircraft. It will be further noted in Fig. 3 that the high point of maximum signal peak 45 is in the region of the longitudinal axis 46 of the aircraft and is actually above that axis instead of being in the region of the level of the extended landing wheel 12.

On the other hand, when one or more of the landing wheels of the aircraft is provided with applicant's invention, the reflector units 15 in the landing wheel 12 create a signal peak 48. Since this high magnitude signal is of a relatively high magnitude, it simplifies the problem of detection and, moreover, since the signal peak is relatively narrow, it favors a high degree of accuracy. With the threshold of the radar receiver adjusted at the level 50 in Fig. 4, the "glint" reflection envelope is entirely eliminated and only the signal returned from a reflector unit in the aircraft tire is detected. This sharp signal is, of course, at the level of the bottom of the landing wheels and therefore may be relied upon to guide the aircraft accurately into contact with the ground.

The second embodiment of the invention shown in Figs. 5, 6 and 7 is similar to the first embodiment except for the method of fabrication. This second form of the reflector unit, which is generally designated by numeral 55, has the usual three sheet portions of woven metal reinforced by a system of interconnected tapes. Such a reflector unit may be fabricated from three separate triangular sheet portions as shown in Fig. 6.

In Fig. 6 the sheet portion 60 is reinforced along one edge 64 by a strip of tape 65, this edge being a rim edge of the finished reflector. A second edge is reinforced by a strip of tape 66 which is to be used to bond the sheet portion 60 with the sheet portion 61. The second sheet portion 61 is also reinforced by a strip of tape 65 along its rim edge 64 and is provided with a second strip of tape 68 along another edge for connecting the sheet portion with the sheet portion 62. The third triangular sheet portion 62 also has a strip of tape 65 reinforcing its rim edge 64 and has a second strip of tape 70 along a second edge for connecting the sheet portion with the sheet portion 61. Finally, the end of a third piece of tape 72 is connected with the sheet portion 62 for the purpose of connecting the corner or apex of the completed reflector unit with the inner tube of the tire at a point spaced substantially rearward from the reflector unit.

By using suitable material to bond the various tapes to the three sheet portions 60, 61 and 62, the three sheet portions may be joined together to form the completed reflector unit shown in Fig. 5. It will be noted that there are three rim tapes 65 and three diagonal interconnecting tapes 66, 68 and 70 and that these tapes will form three tongues 74 at each of the three front corners of the reflector. These tongues may all be used to connect the front corners of the reflector to the inner tube 18 or two of the tongues may be removed and the third tongue used if desired. Fig. 7 shows how a tongue 74 comprising, for example, the forward end of the tape 70, may be bonded to the inner tube 18. Preferably all of the tapes used in the construction of the reflector unit 55 are made of elastic material and preferably the rearwardly extending tape 72 is anchored at a point to maintain the rearward tape under tension and thereby maintain all of the remaining tapes under sufficient tension to hold the reflector to the desired "corner" configuration.

Fig. 8 illustrates a modified practice of the invention which involves the use of snap fasteners at the various anchorage points of the radar reflector. At each of these anchorage points a male fastener element 80 is mounted on the inner surface of the inner tube 18 by means of a disc 82 of flexible material, the disc being directly bonded to the inner tube. The female element 84 of the fastener is suitably mounted in a permanent manner on the reflector unit and is preferably surrounded by a relatively stiff disc 85. The advantage of this construction is that the male fastening elements 80 may be installed on the inner surface of the inner tube 18 early in the procedure of fabricating the inner tube and the reflector units may be quickly installed at a later point in the fabrication procedure. The snap fasteners make it possible to install the reflector units rapidly but with accurate placement. After the reflector units are mounted by means of the snap fasteners for correct positioning of the reflector units, the reflector units may be directly bonded to the inner tube by additional means if so desired.

My description of selected embodiments of the invention, by way of example and to illustrate the principles involved, will suggest various changes, substitutions and other departures from my disclosure that properly lie within the spirit and scope of the appended claims.

I claim:

1. In an aircraft, the combination of: a retractable landing gear including a landing wheel with a tire thereon; and at least one radar reflector mounted inside the tire.

2. A combination as set forth in claim 1 in which a plurality of radar reflectors are positioned at circumferentially spaced positions in the tire.

3. A combination as set forth in claim 2 in which each of said reflectors has one side capable of reflection with maximum efficiency; and in which said reflectors are positioned with their sides of maximum reflection efficiency facing in the same general circumferential direction, said circumferential direction being forward at the lower circumference of the tire.

4. A combination as set forth in claim 3 in which said reflectors are of generally concave configuration on their sides of maximum reflection efficiency.

5. A combination as set forth in claim 4 in which said reflectors are corner reflectors with three reflecting surfaces at substantially 90 degrees from each other.

6. A combination as set forth in claim 1 in which said reflectors are made of flexible material to yield with changes in configuration of the tire.

7. A combination as set forth in claim 6 which includes flexible elements connecting said reflectors with the material of the tire to hold the reflectors to desired shape.

8. A combination as set forth in claim 1 in which said reflectors are made of perforate flexible sheet material.

9. A combination as set forth in claim 1 in which each of said reflectors is made of flexible material and is connected to the inner wall of the tire at three points, one point being substantially at the maximum inner circumference of the tire, the other two points being spaced on opposite sides of the medial plane of the tire in the general region of the juncture of the tire with the rim of the wheel.

10. A combination as set forth in claim 1 in which said reflector is made of flexible material and is connected at spaced points thereof with spaced points on the inner wall of the tire.

11. In an aircraft, the combination of: a retractable landing gear including a landing wheel with a hollow inflatable tire thereon; at least one radar reflector inside the tire comprising three sheets of flexible conducting material positioned at substantially 90 degrees to each other and interconnected to form a corner configuration; and means connecting spaced points of said reflector with the tire to hold the reflector in a forwardly facing position when the tire is rotated to place the reflector at the bottom of the tire circumference.

12. A combination as set forth in claim 11 in which each of said sheets as well as the open end of the reflector is of generally triangular configuration.

13. A combination as set forth in claim 12 in which the open end of said reflector is of truncated triangular configuration with the projected corners of the configuration outside the tire.

14. In an aircraft, the combination of: a landing gear including a landing wheel with a tire thereon; and a plurality of radar reflectors mounted at circumferentially spaced positions inside the tire.

References Cited in the file of this patent

UNITED STATES PATENTS

| 1,454,036 | Brown | May 8, 1923 |
| 2,534,710 | Golian | Dec. 19, 1950 |